Feb. 2, 1932.    E. E. GREVE    1,843,600
BUSHING RETAINING MEANS FOR ROTARIES
Filed July 20, 1928    2 Sheets-Sheet 1
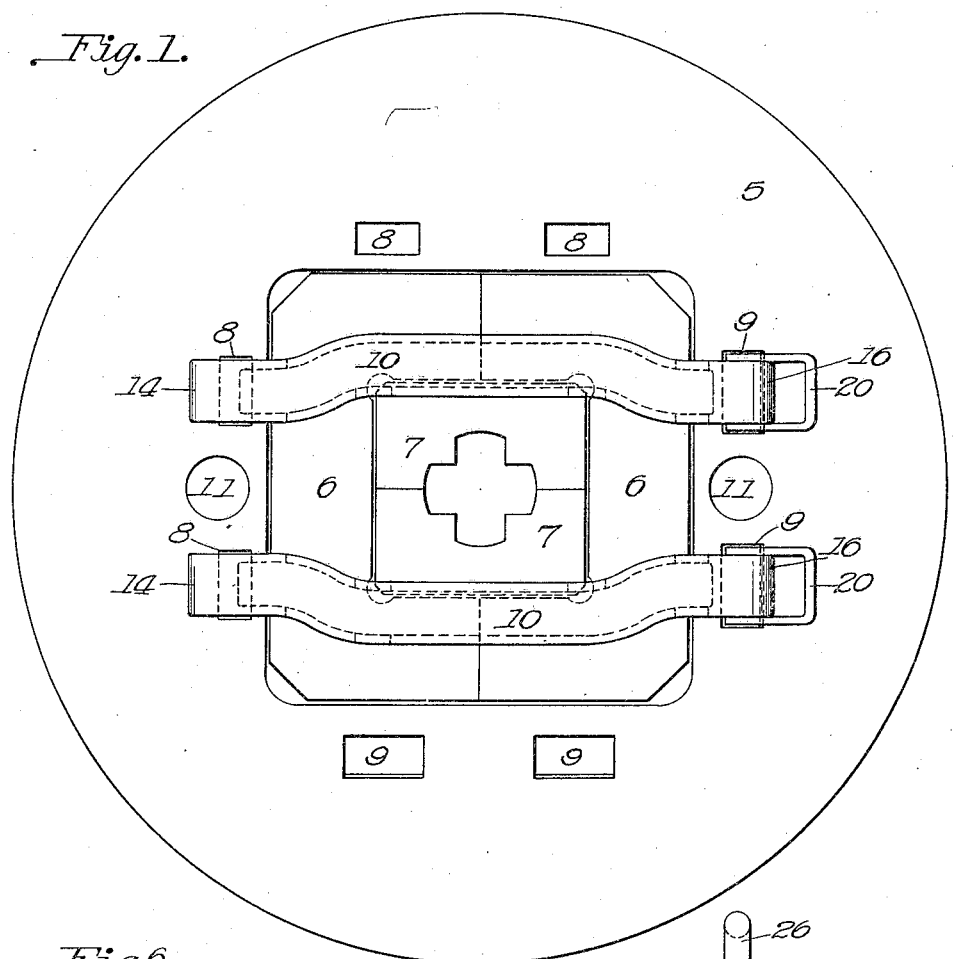
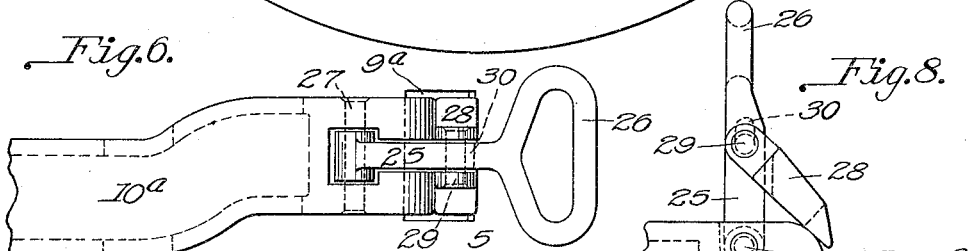
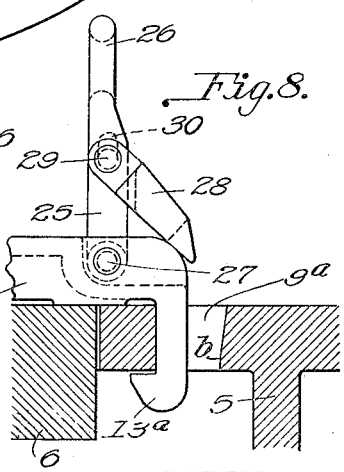
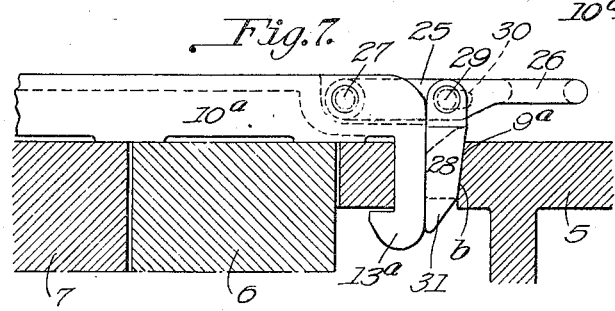
INVENTOR
E. E. Greve
by W. J. Doolittle
Attorney.

Feb. 2, 1932.   E. E. GREVE   1,843,600
BUSHING RETAINING MEANS FOR ROTARIES
Filed July 20, 1928   2 Sheets-Sheet 2
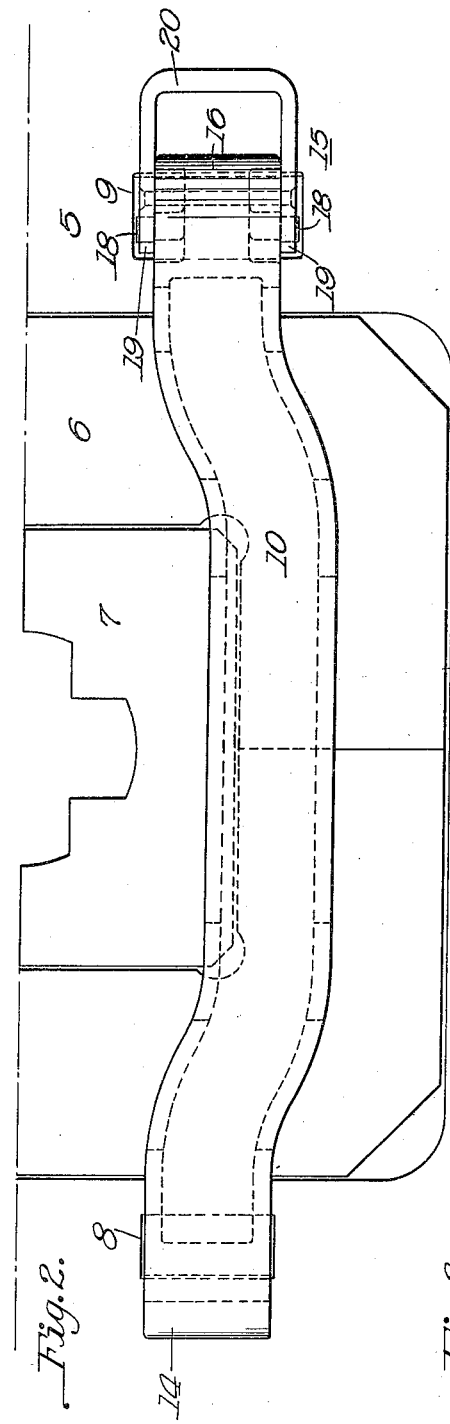
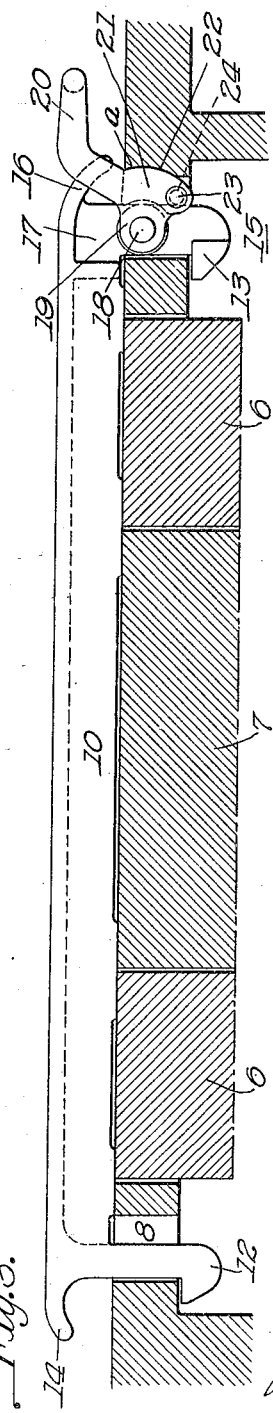
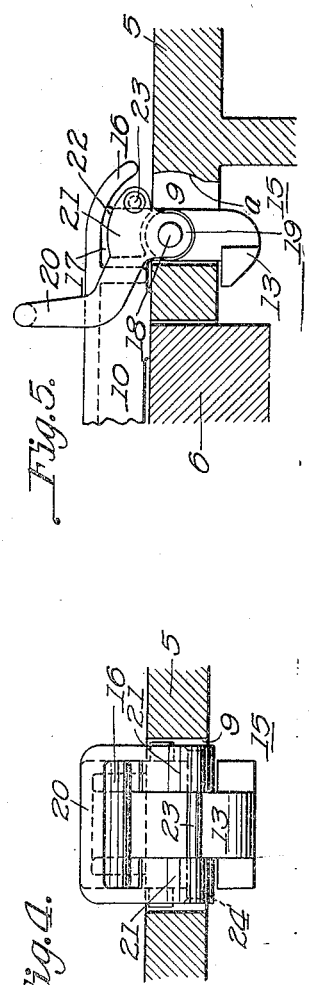
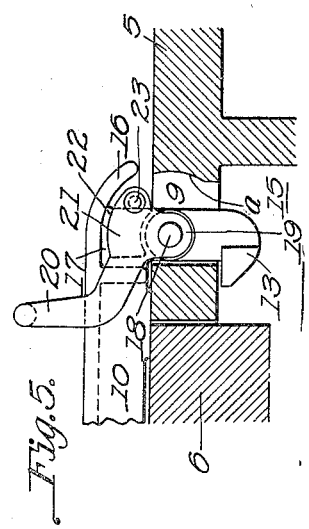
INVENTOR
E. E. Greve
by W. P. Doolittle
Attorney.

Patented Feb. 2, 1932

1,843,600

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

BUSHING RETAINING MEANS FOR ROTARIES

Application filed July 20, 1928. Serial No. 294,220.

This invention relates to rotary drilling apparatus and more particularly to rotary drilling apparatus of the character in which a plurality of bushings are nested within the gear or drive ring of the rotary table.

In rotaries of the class mentioned considerable trouble has been experienced, during the drilling operation, in keeping the bushings, for example, the drive bushing and the grief-stem bushing from being raised out of the drive ring or table or moving out of the desired operative positions within the table.

The prime object of the present invention is to provide simple, strong and efficient means designed to cooperate with the rotary table for maintaining the bushings in the desired positions during drilling operations.

Other objects and advantages of my invention will be either specifically hereinafter referred or will be apparent from a consideration of the following description taken in connection with the drawings.

In the accompanying drawings which illustrate applications of my invention:

Fig. 1 is a top plan view of a table of a rotary drilling apparatus embodying my invention;

Fig. 2 is an enlarged detail top plan view particularly showing a plurality of bushings and a retaining bar or member shown in connection therewith;

Fig. 3, an enlarged sectional view of a portion of a table and concentrically assembled bushings, with the bushing locking or retaining means shown in elevation;

Figs. 4 and 5, detail views partly in section and partly in elevation particularly showing the locking means for the bushing retaining bars or members of the form of Fig. 1;

Fig. 6, a detail plan view of a portion of a retaining member showing a modified form of locking means;

Fig. 7, a detail view particularly showing the form of Fig. 6 applied in locked position to the table; and Fig. 8, a detail view similar to Fig. 7 showing the said means in unlocked position.

Referring to the drawings, 5 designates the rotary table of a rotary drilling apparatus or it may indicate the element of the rotary table commonly called the drive gear ring. 6 and 7 designate sectional bushings disposed in the table and usually termed drive bushings and grief-stem bushings respectively; these bushings as shown are non-circular but they may be of any desired configuration. In addition to being provided with the centrally positioned bushing receiving opening the table or member 5 as illustrated is formed with two series of openings 8 and 9, the openings 8 being designed to receive depending engaging hook portions of bushing retaining bars or members 10 and the openings 9 being adapted to receive other depending hook portions of the said members 10 and portions of locking means as hereinafter described. 11 designates openings to receive posts, not shown, employed for carrying a tong, not shown.

In use, two retaining bars or members 10 are employed. The manner of assembling said members relatively to the rotary and its bushings is shown by Fig. 1. Members 10 are each preferably of channel shape in cross-section and formed at its respective ends, with depending hook members 12 and 13 adapted to be entered in a pair of openings 8 and 9. Adjacent the hook member 12, the bar 10 is provided with a handle 14 and associated with the other hook member 13, I provide a locking means designated generally by 15 and an additional handle portion 16 similar to 14.

Locking means 15 is designed to be pivotally mounted on an end of the retaining member 10, and for this purpose the end portion 17 of member 10 is provided with trunnions 18 to receive apertured bosses 19 of a yoke member 20. The inner ends of member 20 in addition to the bosses 19 are formed with cam members 21, the latter having surfaces 22 adapted to engage and cooperate with a curved wall a of an opening 9. 23 designates a stop pin or a headed rivet for limiting the rotative movement of the locking means and for connecting the spaced-apart ends of the yoke member together. In order to accommodate this pin 23 the cam members 21 are provided with openings 24 through which the pin is passed.

In operation, the hook members 12 and 13 are inserted in their respective openings and the bar moved to the left, the locking means being in the postion of Fig. 5. Upon rotating said means, the cam members 21 engage the curved walls a of the slots, thereby securing the bar and the bushings against upward movement.

In the form of Fig. 6 the retaining bar locking means differs slightly from that of Fig. 1; in this latter form, I employ a link or lever 25 having a handle portion 26, said link being fulcrumed to the bushing retaining bar 10a by a pin 27. Member 25 carries a loosely mounted wedge member 28, the latter being secured to the said member 25 by a pin connection 29 mounted in an elongated slot 30 formed in member 25. Member 28 is designed to be entered in an opening 9a having a slanting or inclined wall b and is preferably provided with a tapered end portion 31. In this form, the bushing retaining member is provided with hook end members similar to the members 12 and 13 of the form of Fig. 1; 13a designates one of these members, the other hook member not being shown.

The action of the modified locking means is similar to that previously described.

In applying the retaining members to the rotary, a member is grasped by the handles and moved so that the hook portions 12 and 13 are over the respective openings 8 and 9 of the table; said portions 12 and 13 are then entered in the openings and the member 10 moved to the left or into the postion particularly shown by Fig. 3. When positioning said member 10 as above stated, the locking means 15 is in the position shown by Fig. 5. By moving the locking means from the position of Fig. 5 to the position of Fig. 3, it will be noted that the cam members 21 engage the curved wall a of the opening 9, thereby effecting an efficient locking of member 10 to the rotary, and maintaining the member 10 in the desired position relatively to the bushings to prevent the bushings being raised from the table.

It will be readily understood that in applying the form of Fig. 6 to a rotary, substantially the same method is followed as in applying the form of Fig. 1. In both forms the bushing retaining member is locked in position by a wedging action of the locking means. The retaining members may be readily removed from the rotary by reversing the direction of movement of the locking means and then lifting said members free of the rotary.

It will be noted that in both forms shown the table-engaging faces of the depending hook members 12, 13 and 13a are in a plane parallel with and extend in the same direction as the body 10, thereby enabling the locking means to be positioned at one end only of the said member 10.

What I claim is:

1. The combination with a rotary table, of bushing retaining means including a member having end depending table engaging means and extending over the bushing receiving opening of the table and over the contained bushings; said table having openings to receive the depending engaging means, and a wedge acting locking means on said member for locking the retaining member to the table.

2. The combination with a rotary table, of bushing retaining means including a member disposed over a bushing disposed in the table, said table and retaining member having cooperating engaging means, and wedge acting locking means carried by the retaining member for locking the retaining member to the table.

3. The combination with a rotary table, of bushing retaining means including a member disposed over a bushing disposed in the table, said table and retaining member having cooperating engaging means, and locking means carried by the retaining member for locking the retaining member to the table, said table having an opening to receive a portion of the retaining member and a portion of the locking means.

4. A bushing retaining member having depending end members adapted to engage a rotary table, and wedge acting locking means carried by the retaining member and cooperating with the table for locking the retaining member thereto.

5. A bushing retaining member having depending end members adapted to engage a rotary table, and locking means carried by the retaining member; said locking means being pivotally mounted on the retaining member.

6. A bushing retaining member for a rotary table comprising an elongated body having spaced devices depending therefrom for engaging beneath portions of the table, and means for wedging a device in place to lock the bushing retaining member against displacement.

7. A bushing retaining member for a rotary table comprising an elongated body having spaced hooks depending therefrom for engaging beneath portions of the table, and means for wedging a hook in place to lock the bushing retaining member against displacement, said hooks extending in the same direction so as to engage the table by the same movement of the bushing retaining member.

8. A bushing retaining member for a rotary table comprising an elongated body for spanning a bushing receiving opening in the table, spaced engaging devices depending from the body, and means having a wedging action for imparting longitudinal movement to said body to lock said engaging devices to the table.

In testimony whereof I affix my signature.

EDGAR E. GREVE.